Patented July 28, 1931

1,816,051

UNITED STATES PATENT OFFICE

STEWART J. LLOYD AND ABSALOM MASON KENNEDY, OF UNIVERSITY, ALABAMA, ASSIGNORS TO CHEMICAL PRODUCTS COMPANY, A CORPORATION OF FLORIDA

METHOD FOR TREATING PHOSPHATE MATERIAL

No Drawing.    Application filed May 21, 1928.    Serial No. 279,616.

This application is a continuation in part of our application, Serial No. 171,720, filed February 28, 1927.

This invention relates to a method for treating phosphate material, such as phosphate rock, to produce a concentrated, soluble fertilizer containing nitrogen and phosphorus and has for its object the production of such fertilizer directly from insoluble phosphate material in a simple and economical maner.

A further object of our invention is to provide a cyclic process for the production of ammonium phosphate wherein provision is made for the use and regeneration of the reacting agent employed.

A still further object of our invention is to free the phosphate content of the raw material acted upon with an agent which is conserved and regenerated during each cycle of operation.

Another object of our invention is to provide, in a process of the character designated, a means whereby phosphates and sulphates in solution are efficiently and economically separated.

Ammonium phosphate, as a concentrated, soluble fertilizer containing nitrogen and phosphorus, is recognized as having a number of advantages, among which are that it is thoroughly soluble in water, is not hygroscopic, contains a high percentage of plant food, mixes well with other fertilizer materials and may be easily granulated or reduced to a form which can be readily handled by the usual fertilizer distributers. Its commercial production as a fertilizer has heretofore been seriously limited, however, by reason of excessive cost of its manufacture.

Heretofore, ammonium phosphate has been produced indirectly by mixing ammonia with phosphoric acid which was liberated from the raw material by one of the following methods:

*Chemical process.*—The phosphate content of the insoluble raw material, such as phosphate rock, was displaced by substitution with another acid, such as sulphuric, and the phosphoric acid thus liberated was then separated from the insolubles accompanying it and was concentrated and stored.

*Volatilization process.*—The phosphate content of the raw material was liberated as phosphorus by heat in an electric or fuel fired furnace and collected, either in the form of phosphorus or, with an electrostatic precipitator, in the form of concentrated phosphoric acid produced by the action of air and moisture on the phosphorus in the furnace. If collected as phosphorus, this was converted into phosphoric acid by the action of steam or of air.

These processes require the expenditure of either a considerable quantity of sulphuric acid, or of electric energy, or fuel, and the separation, collection and storage of phosphorus or of phosphoric acid is somewhat difficult and is expensive.

We have found that the expenditure of acids, energy or fuel and the separation, collection and storage of phosphoric acid, together with the subsequent operation of mixing this acid with ammonia may be avoided and that ammonium phosphate may be produced directly and more economically from the natural phosphate material in the following manner:

The insoluble, natural phosphate is mixed with a solution containing six parts of ammonium bisulphate to each equivalent of $P_2O_5$ in the natural phosphate when a reaction takes place in which there is produced a precipitate containing calcium sulphate and a solution containing ammonia sulphates and phosphates. We have found, where a less amount of ammonium bisulphate is employed, the reaction is not satisfactorily completed. The reaction may be represented as follows:

(1) 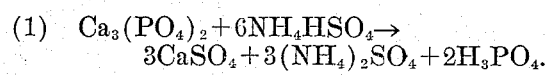
$$Ca_3(PO_4)_2 + 6NH_4HSO_4 \rightarrow 3CaSO_4 + 3(NH_4)_2SO_4 + 2H_3PO_4.$$

The precipitate is separated from the solution and an excess of ammonia is added to the latter whereupon the phosphate content is precipitated as relatively insoluble tri-ammonium phosphate, the sulphate content remaining in solution as ammonium sulphate, which reaction may be represented as follows:

(2) $3(NH_4)_2SO_4 + 2H_3PO_4 + 6NH_3 \rightarrow 3(NH_4)_2SO_4 + 2(NH_4)_3PO_4$.

The precipitate of tri-ammonium phosphate is separated from the solution and is heated in a dryer when ammonia is driven off and a mass containing di-ammonium phosphate, mono-ammonium phosphate or a mixture of these salts is obtained substantially as shown:

(3) $2(NH_4)_3PO_4 + (heat) \rightarrow 2(NH_4)_2HPO_4 + 2NH_3$
or
$2(NH_4)_3PO_4 + (heat) \rightarrow 2(NH_4)H_2PO_4 + 4NH_3$.

The precipitate of calcium sulphate from reaction (1) is digested with ammonium carbonate or its equivalent and by the following known reaction ammonium sulphate is formed in solution and calcium carbonate as a precipitate:

(4) $3CaSO_4 + 3(NH_4)_2CO_3 \rightarrow 3CaCO_3 + 3(NH_4)_2SO_4$.

The ammonium sulphate solutions from Reactions (2) and (4) are collected, are evaporated and the resultant crystals are heated to about 300° C. when ammonia is driven off and collected and ammonium bisulphate is formed for reuse with a fresh batch of raw material as follows:

(5) $3(NH_4)_2SO_4 + 3(NH_4)_2SO_4 \rightarrow 6NH_4HSO_4 + 6NH_3$.

It will be observed that in the production of ammonium phosphate by this process, the ammonium bisulphate is not expended but is used over and over again, being regenerated in each cycle of operation of the process.

When considered separately and by themselves, we are aware that some of the steps of our process have heretofore been disclosed. For example, Step No. 1, in which acid sulphates are caused to react on phosphate rock, has heretofore been taught, the specific substance and the proportions we employ, however, give a far better result than any heretofore known and, so far as we are aware, are entirely new.

Step No. 3, in which tri-ammonium phosphate is heated and converted into di- or mono-ammonium phosphate, is known in the art, as are Step No. 4, in which ammonium sulphate is produced by the reaction of a solution containing ammonium carbonate on calcium sulphate, and Step No. 5, in which ammonium sulphate is heated to form ammonium bisulphate.

Step No. 2, in which an excess of ammonia is caused to react on a solution containing ammonium sulphates and phosphates for the purpose of separating the phosphates from the sulphates, is, so far as we are aware, entirely novel, and provides a ready economical means for separating the phosphates from the sulphates, whereas, heretofore, the latter have gone into the final product as useless material.

The combination of steps for obtaining ammonium phosphate directly from phosphate rock, as herein described, has not, so far as we are aware, heretofore been known or used. It will be apparent that the process embodies in this combination of steps greatly reduces the cost of manufacture in that the only raw materials required are phosphate rock, carbon dioxide and ammonia. The acid used in the process being conserved and reused in a cycle and the expediture of electric energy or fuel being eliminated.

In practice, we prefer to proceed as follows:

The natural phosphate, as phosphate rock, is pulverized and is mixed with water in a vessel provided with an agitator. To each 310 parts of phosphate rock corresponding to $Ca_3(PO_4)_2$ is added approximately 700 parts of ammonium bisulphate, preferably in molten form as that produced in a subsequent operation. The mass is kept agitated until the reaction is substantially completed when the precipitate, which consists of calcium sulphate and the insolubles present in the raw material, is separated by filtration or by decantation from the solution containing soluble sulphates and phosphates.

To this solution is added an excess of ammonia comprising at least six parts for each equivalent of $P_2O_5$ in the solution, when the soluble sulphates and phosphates will be separated, the latter as a precipitate of tri-calcium phosphate which is relatively insoluble in the solution of ammonium sulphate. This reaction is exothermic and is best performed in a vessel provided with a means for absorbing the heat generated.

What we claim is:

1. A cyclic process for the production of ammonium phosphate from tricalcium phosphate which consists in treating the phosphate material with at least six parts of ammonium bisulphate for each equivalent of $P_2O_5$ in the phosphate material and separating the resulting calcium sulphate as precipitate from the solution, treating the solution with at least six parts of ammonia to each equivalent of $P_2O_5$ in the solution to form triammonium phosphate and to separate the phosphates from the sulphates contained in solution, and treating the sulphates to form ammonium bisulphate for reuse in the cycle.

2. A cyclic process for the production of ammonium phosphate from tricalcium phosphate which consists in treating the phosphate material with sufficient ammonium bisulphate to form with the base insoluble calcium sulphate and separating the sulphate of the base as precipitate from the solution, treating the solution with an excess of ammonia to form triammonium phosphate and to separate the phosphates from the sulphates contained in the solution, subjecting the triammonium phosphate to heat to drive off ammonia therefrom, digesting the calcium sulphate resulting from the first reaction with ammonia and carbon dioxide to form a precipitate of calcium carbonate and a solution containing ammonium sulphate, and evaporating the ammonium sulphate solutions and heating the resulting crystals to form ammonium bisulphate for reuse in the cycle.

3. A cyclic process for the production of ammonium phosphate from a phosphate of a base which forms an insoluble sulphate, which consists in treating the phosphate material with six parts of ammonium bisulphate to each equivalent of $P_2O_5$ in the phosphate and separating the sulphate of the base as precipitate from the solution, treating the solution with at least six parts of ammonium for each equivalent of $P_2O_5$ in the solution to separate the phosphates from the sulphates contained therein, subjecting the phosphate to heat to drive off ammonia therefrom and collecting the ammonia, digesting the calcium sulphate resulting from the first reaction with ammonia and carbon dioxide to form a precipitate of calcium carbonate and a solution containing ammonium sulphate, and evaporating the ammonium sulphate solutions and heating the resulting crystals to form ammonium bisulphate for reuse in the cycle.

In testimony whereof we affix our signatures.

STEWART J. LLOYD.
ABSALOM MASON KENNEDY.